United States Patent [19]

Kinoshita et al.

[11] Patent Number: 4,768,223
[45] Date of Patent: Aug. 30, 1988

[54] PUBLIC TELEPHONE SET WITH INTERNAL CHARGE PROCESSING

[75] Inventors: Toshiharu Kinoshita; Shuji Kunii; Yoshiki Sano, all of Kanagawa, Japan

[73] Assignee: Tamura Electric Works, Ltd., Tokyo, Japan

[21] Appl. No.: 837,009

[22] Filed: Mar. 6, 1986

[30] Foreign Application Priority Data

Mar. 8, 1985 [JP] Japan .................................. 60-44550

[51] Int. Cl.⁴ .............................................. H01B 5/02
[52] U.S. Cl. ..................................... 379/143; 379/155; 379/36
[58] Field of Search .................... 379/36, 46, 132, 130, 379/143, 155

[56] References Cited

U.S. PATENT DOCUMENTS

| | | | |
|---|---|---|---|
| 3,329,779 | 7/1967 | Clark, Jr. ............................ | 379/132 |
| 3,519,745 | 7/1970 | Colman ................................ | 379/45 |
| 3,937,893 | 2/1976 | Muller et al. ....................... | 379/80 |
| 4,122,308 | 10/1978 | Weinberger et al. ................ | 379/131 |
| 4,198,545 | 4/1980 | Haist et al. ......................... | 379/132 |
| 4,595,983 | 6/1986 | Gehalo et al. ...................... | 379/36 |
| 4,644,109 | 2/1987 | Takeda et al. ...................... | 379/27 |

FOREIGN PATENT DOCUMENTS

| | | | |
|---|---|---|---|
| 60-120649 | 6/1985 | Japan ................................... | 379/132 |
| 2088171 | 6/1982 | United Kingdom ................. | 379/36 |
| 2105149 | 3/1983 | United Kingdom ................. | 379/146 |

OTHER PUBLICATIONS

Scanlon, *IBM PC & XT Assembly Language,* 1983 (Robert J. Brady Co., Bowie, MD 20715), pp. 87–88, 96, 189–192.

*Primary Examiner*—Robert Lev
*Attorney, Agent, or Firm*—Blakely, Sokoloff, Taylor & Zafman

[57] ABSTRACT

A public telephone set that processes call charge information is provided. The set includes a register for holding a pre-determined number of digits of the dialed number and a memory in which dial control codes corresponding to the predetermined number of digits are stored in advance. Depending upon the telephone number that is dialed, a memory location is directly addressed to obtain a control code. The control code specifies a memory location in which charging information such as a charge or time increment is stored. This information is then processed to determine the appropriate charge for the number dialed.

15 Claims, 9 Drawing Sheets

PUBLIC TELEPHONE SET WITH INTERNAL CHARGE PROCESSING

BACKGROUND OF THE INVENTION

The present invention relates to a public telephone set, and more particularly to a public telephone set provided with a dial call originating means and having function to effect a charging or billing processing.

Hitherto, there has been known a metering system as shown in the Japanese patent preliminary publication No. 59-25546 as means for allowing a public telephone set which connects to a switching system or an exchange to which an office multi-charging signal based on the periodic pulse metering method or Carlson method is not transmitted to effect a toll call.

However, this system is configured to consider only the second digit subsequent to the first digit "0" and to select e.g. one from four kinds of timer intervals or time periods. When an attempt is made to deal with a plurality of digits and to provide a larger number of timer intervals, the circuit configuration which combines these functions becomes complicated, with the result that its realization is difficult in practice.

SUMMARY OF THE INVENTION

With the above in view, an object of the present invention is to easily realize a toll call by a public telephone set of the type connecting to a switching system to which an office multi-charging signal based on the periodic pulse metering method is not transmitted.

Another object of the present invention is to provide a public telephone set which facilitates an increase in the number of digits of a number to be considered for determination of timer intervals and the timer intervals themselves, thus making it possible to finely set charging or billing information to the terminal equipment.

According to the present invention, there is provided a public telephone set provided with dial originating means and having a function to effect charging processing, the public telephone set comprising discriminating means for monitoring the condition of an office line after the dial originating to discriminate a response of a called party, holding means for holding a predetermined number of digits of the originating dial number output by the dial originating operation per each of the digits as a code of a plurality of bits, first memory means in which dial control codes corresponding to the predetermined number of digits of the call originating dial number are stored in advance, addresses of the first memory means being designated by the code output of the plurality of bits, thereby to read out a corresponding dial control code therefrom, charging information determination means responsive to variable information based on the dial control code read out from the first memory and fixed information set in advance to determine a charging time and a charging rate, and charging operation control means activated by an output of the discriminating means to control the charging operation on the basis of charging information from the charging information determination means.

The public telephone set may further comprise second memory means in which the variable information is stored in advance, the charging information determination means being operative to designate addresses of the second memory means by using the dial control code read out from the first memory means to further read out corresponding variable information, thus determining a charging time or a charging rate.

BRIEF DESCRIPTION OF THE DRAWINGS

The features and advantages of a public telephone set according to the present invention will become more apparent from the following description taken in conjunction with the accompanying drawings, in which.

DETAILED DESCRIPTION OF A PREFERRED EMBODIMENT

The present invention will be described in detail in connection with a preferred embodiment with reference to accompanying drawings.

Figure 1:
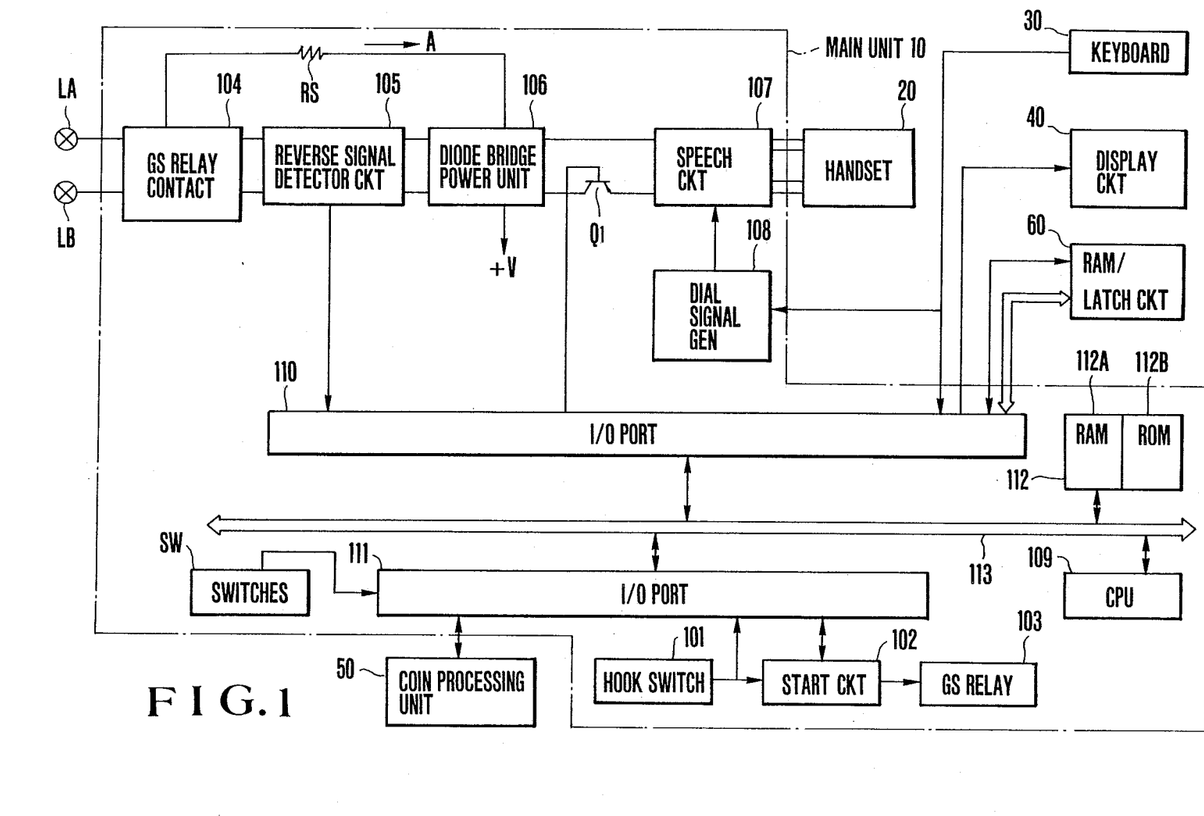
FIG. 1 is a block diagram illustrating a preferred embodiment of a public telephone set according to the present invention.

FIG. 1 is a block diagram illustrating an embodiment when the present invention is applied to a public telephone set of the office power supply type. The public telephone set comprises a main unit 10 including a speech circuit to be referred to later, the main unit 10 being provided with office line terminals LA and LB to which lines from an office are connected, a handset 20, a key board 30 including dial keys of 3×4 matrix, a display circuit 40 operative to display a credit (an amount of unused coins) or the like by using e.g. a liquid crystal device etc. and a coin processing unit 50 provided with various sensors and a magnet to effect selection/accumulation and collecting/returning of coins.

Figure 2:
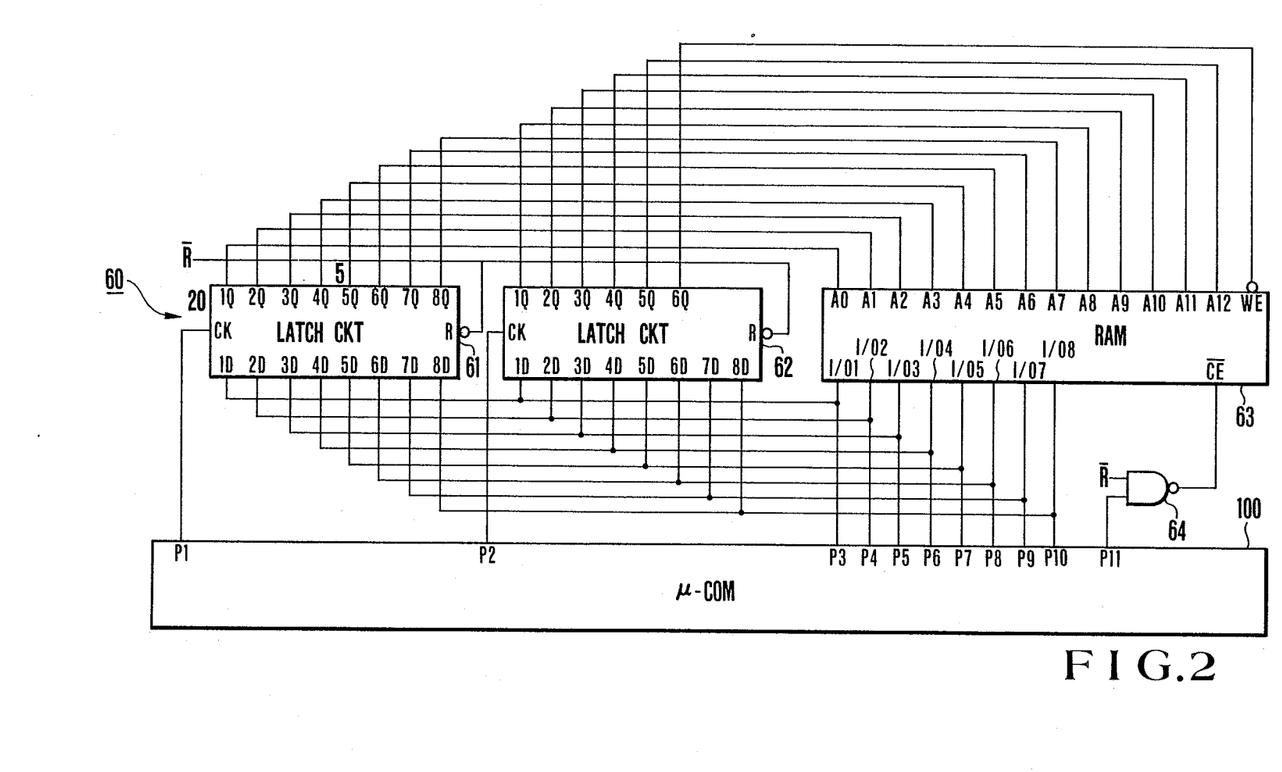
FIG. 2 is a circuit diagram illustrating an external RAM and a latch circuit employed in the present invention.

When a hook switch 101 transmits an output indicative of off-hook by the operation of the handset 20, a start circuit 102 responds to this output to energize a GS relay 103. As a result, a GS relay contact 104 is closed to connect a speech circuit 107 to the line terminals LA and LB through a reverse signal detector circuit 105 which detects a reverse signal from an exchange when a called party responds to a dial call originating, and a diode bridge and power unit 106 to close a DC loop with respect to the lines, thus enabling a telephone call by the handset 20. The power unit of the unit 106 produces a local power supply voltage by making use of a line current flowing when the DC loop is closed to deliver it to each part. In addition, during on-hook i.e. opening condition of the above-mentioned DC loop, this power unit allows a current to such an extent that the exchange does not respond to current flow through a resistor RS of high resistance via a loop indicated by an arrow A in the figure to charge a capacitor. The diode bridge of the unit 106 is provided for maintaining the line current delivered to the power unit at a fixed polarity. A forced cut-off transistor $Q_1$ is provided between the unit 106 and the speech circuit 107. To the speech circuit 107, a dial signal generator 108, such as a touch tone generator, is coupled. When no coins are accumulated, the dial signal generator 108 outputs a warning pay tone to a receiver of the handset 20 through the speech curcuit 107, thus urging a user to additionally pay a necessary coin or coins. The key board 30, the display circuit 40 and the coin processing unit 50 etc. are controlled by a processor unit (which will be simply called a "CPU" hereinafter) 109 comprising a well known microprocessor etc. through I/O (input and output) ports 110 and 111. The above-mentioned start circuit 102 is directly controlled by an output of the hook switch 101 and is also controlled by the CPU 109. Further, the main unit 10 is provided with a memory unit 112 comprising a fixed memory (ROM) 112A in which programs and other fixed data are stored and a variable memory (RAM) 112B. The CPU 109, the I/O ports 110 and 111 and the memory 112 are interconnected through a bus line 113. In addition, this telephone set is provided outside the main unit 10 with an external RAM and latch circuit 60 used for setting a charging or billing timer interval in accordance with a dial number as described later, which circuit 60 is configured as shown in FIG. 2.

The control processing effected by the CPU 109 is now described. The description below is limited to a range necessary for understanding of the present invention and parts which do not directly relate to the feature of the present invention will be suitably omitted. This is applicable to the operation in connection with FIG. 1.

Figure 3:
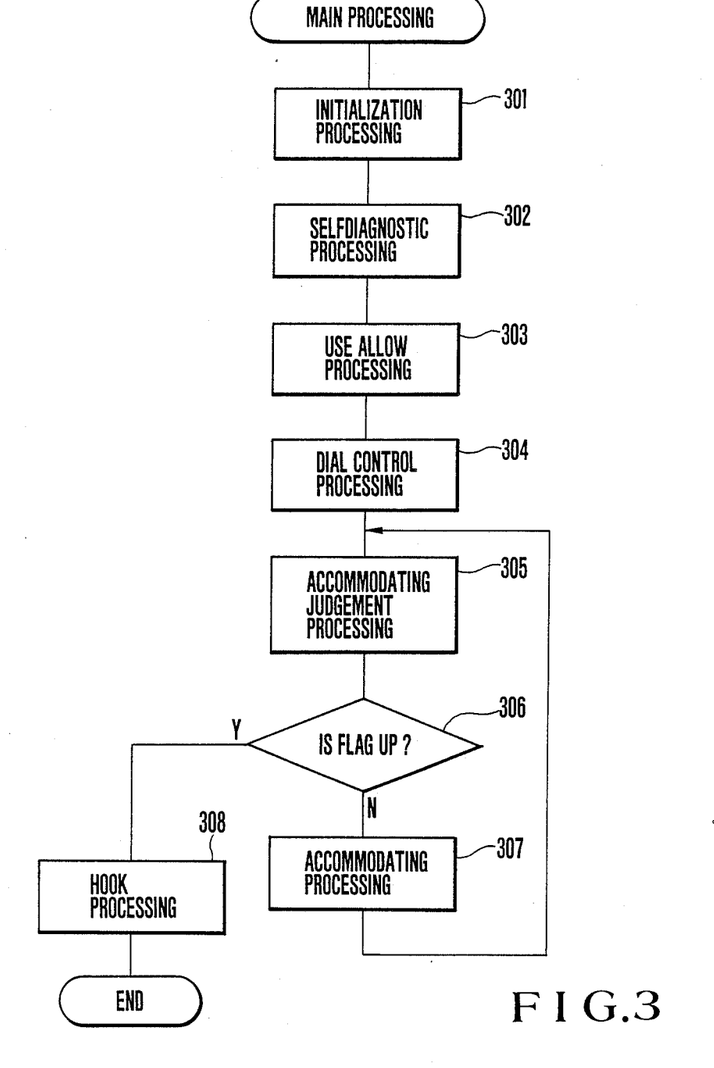
FIGS. 3 to 8 are flow charts showing a processing program of CPU provided in the public telephone set shown in FIG. 1, respectively.

FIG. 3 is a flow chart showing a main processing program executed by the CPU 109. When the DC loop is closed by the off-hook signal as previously described, and a power supply voltage reaches a prescribed value so that power-on-reset is released, the CPU 109 provides an access to the ROM 112A to execute an initialization processing (step 301) to initialize each register of the RAM 112B, buffer registers of the I/O ports and the like. At the final stage of this step, interruption is allowed by an interrupt processing program that exists in addition to the above-mentioned main processing program in this embodiment. The main processing is interrupted at fixed interval times e.g. 4 ms to execute interrupt processing. The processings in regard to a dial key input from the key board 30, an input from the reverse signal detector circuit 105, sense of each input, selection of coins inserted, metering of the credit, dial transmission and the like are carried out by the interrupt processing.

The detailed operation of the interrupt processing is described in U.S. Ser. No. 785,346 filed on Oct. 7, 1985 by the same assignee (issued as U.S. Pat. No. 4,644,109).

Turning to the main processing, after the initialization, the CPU 109 executes self-diagnostic processing (step 302) to check as to whether there exists a failure of clogging of coins etc. As a result, when it is judged that there is not abnormal condition, use allow processing is carried out (step 303). Thus, when a coin (a predetermined regular coin) above the unit charging rate is inserted, dialing is possible. Next is to effect dial control processing (step 304). This processing is to check as to whether special dial key inputs e.g. various forbidden dials or charge-free dials are present or absent, which will be described in detail later. The program execution shifts to an accommodating judgement processing of coins (step 305). This step is to judge whether it is required to accommodate coins or not and to count the amount of coins accumulated depending upon an output of a charging timer to be referred to later as a charging signal and the coins accumulated. In the case of the above-mentioned charge-free mode, it is naturally judged that it is unnecessary to accommodate coins. Next, the CPU 109 provides an access to a predetermined area in the RAM 112B to confirm that a hook flag is not up (step 306), thereafter to shift to a processing for accommodating coins (step 307). When the flag is not up, a predetermined accommodating magnet within the coin processing unit 50 is operated to move a corresponding accommodating lever to open a path from an accumulating line to a cash box. In contrast, when the hook flag is up e.g. because of the above-mentioned forbidden mode due to the on-hook or occurence of any forced cut-off reason, the program execution immediately shifts from the step 307 to a hook processing (step 308), thus to open the DC loop to restore the exchange.

Figure 4:
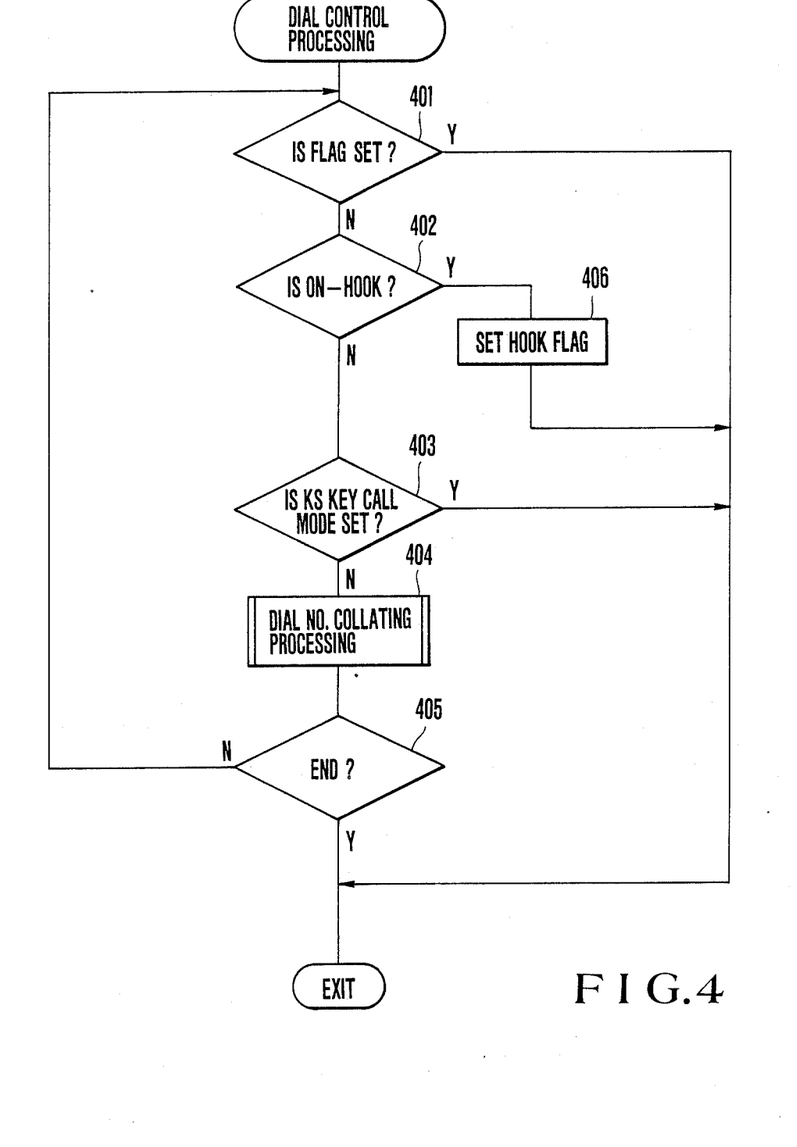

Next, the dial control processing will be described with reference to FIG. 4.

Figure 5:
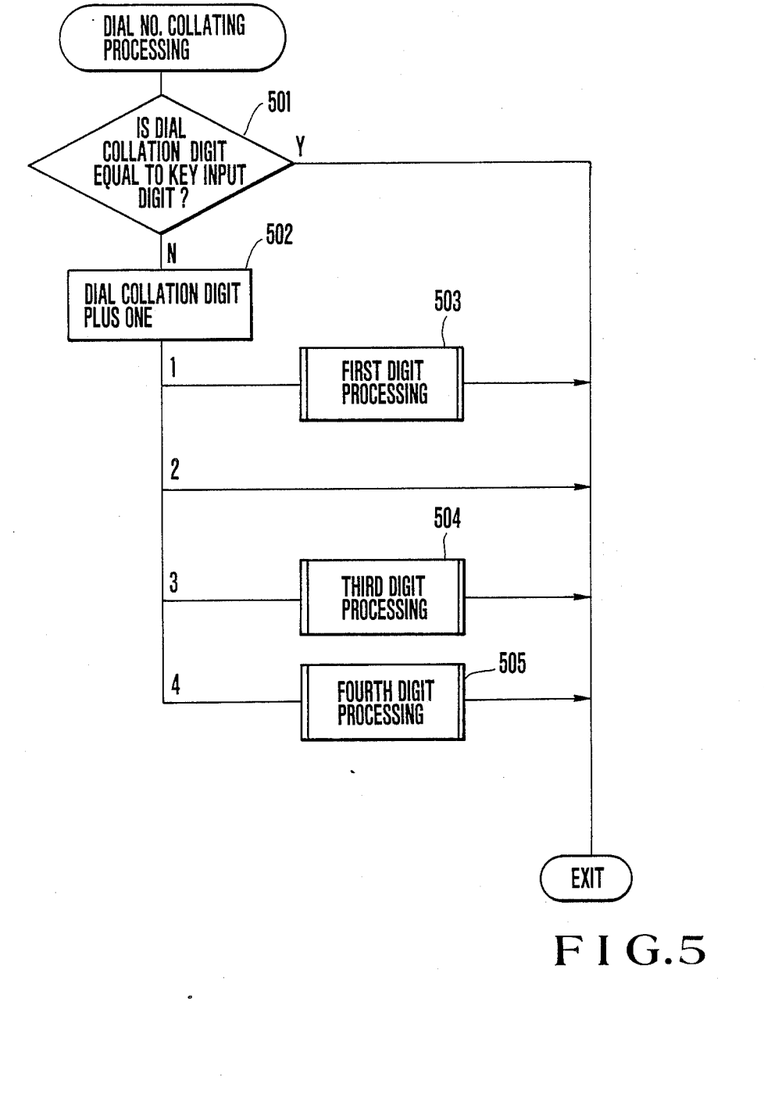

The CPU 109 checks as to whether the hook flag is set (up) or not (step 401). As a result, when the hook flag is not set, the CPU 109 confirms that the on-hook is not present (step 402) and then checks as to whether a KS call mode is set or not depending upon whether a flag is set or not in a predeterined area of the RAM 112B of the memory unit 112 (step 403). When the KS speech mode is set, the operating mode is judged as a special operating mode, and the program branches to the dial control processing (FIG. 5). In contrast, when the KS speech mode is not set, the program execution shifts to a dial number collating processing which collates a dial number with a predetermined number to execute processings corresponding to the collated results as described later (step 404). When an end flag is set (step 405), this processing is completed. Returning to step 402, when the on-hook is detected (step 402), the hook flag is set (step 406), thus to immediately complete the dial control processing.

When the program execution shifts to the dial number collating processing, as shown in FIG. 5, the CPU 109 checks digits to be processed by comparing the contents of the register indicating dial collation digits utilizing a predetermined area in the RAM 112A of the memory unit 112 with the contents of the register indicating key input digits (step 501). As a result, when the contents of the above-mentioned registers are not equal to each other, i.e., the latter is above the former, the CPU 109 increments the contents of the register indicating the dial collation digit by "1" in order that this data represent unprocessed key input data (step 501). When the results of the increment represent "1", "3" and "4", the CPU 109 executes the first, the third and the fourth digit processings, respectively (steps 503 to 505).

Figure 6:
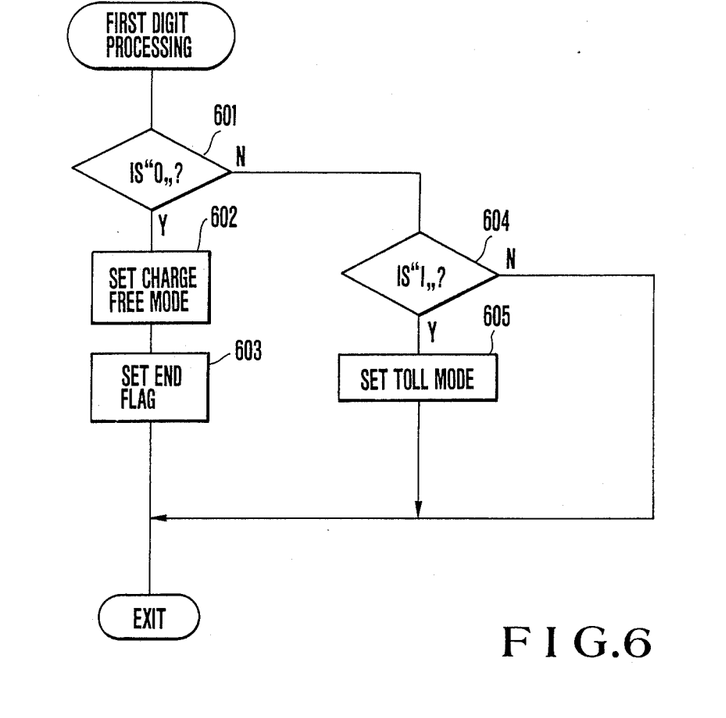

Referring FIG. 6, in the first digit processing, the CPU 109 checks as to whether the first digit dial number represents "0" or not on the basis of the dial number data. The dial number if detected with respect to X- and Y-axes of the key pad in an input processing in the interrupt processing program and stored in a predeterined area in the RAM (the internal RAM) 112B of the memory unit 112 as a binary code of 4 bits (step 601). In this embodiment, the fact that the first digit represents "0" corresponds to the charge-free dial. Accordingly, the CPU 109 sets the charge-free mode (step 602), thereafter immediately an end flag (step 603), thus completing the first digit processing.

In contrast, when the first digit does not represent "0" (step 601), the CPU 109 checks as to whether it represents "1" or not (step 604). As a result, when the first digit represents "1", this is a toll number. Accordingly, the CPU 109 sets a toll mode (step 605). In other words, where dial is started with the remaining numbers 2 to 9 in this embodiment, these numbers belong to the local number.

Figure 7:
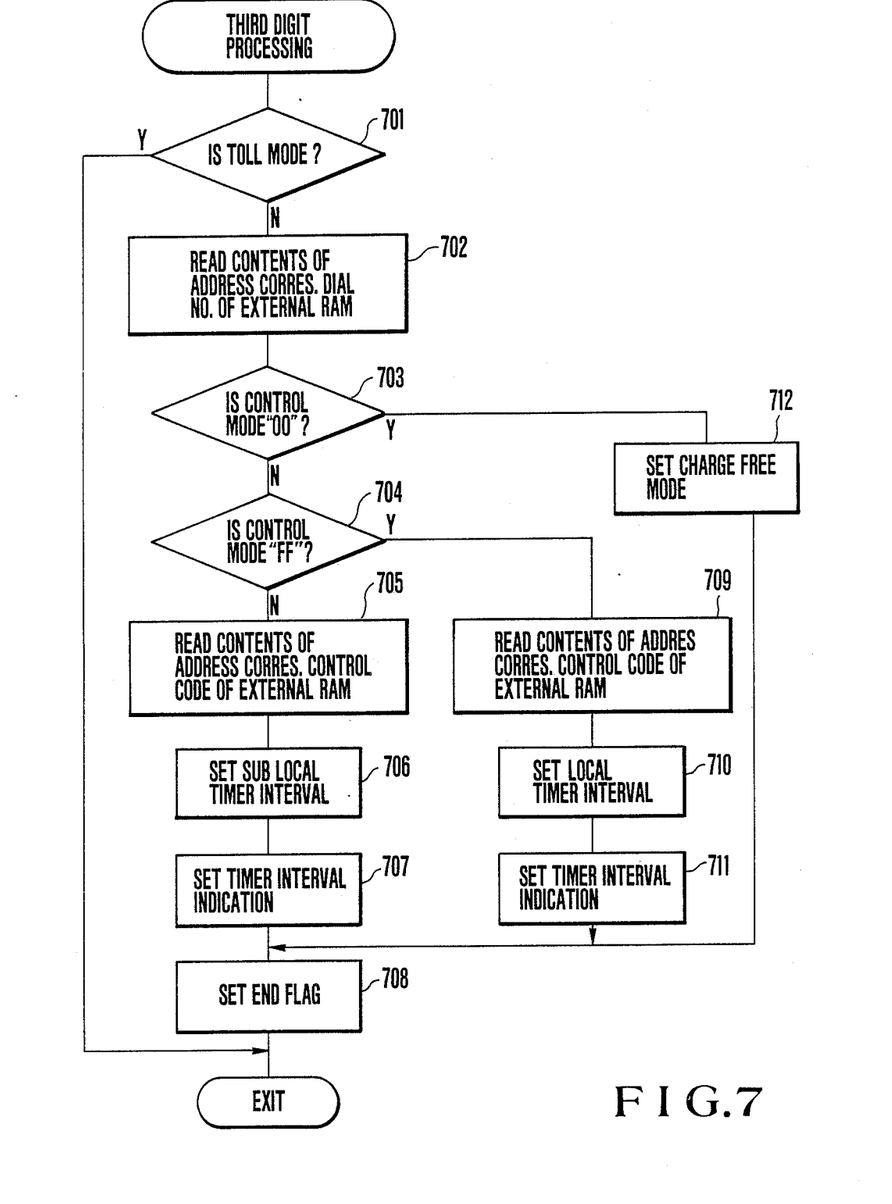

Further, in the case of the third digit processing, the CPU 109 provides an access to a memory area assigned to an address corresponding to the dial number of the third digit of the RAM in the external RAM and the latch circuit 60 in accordance with the following method to read the contents thereof (step 702), only when the above-mentioned toll mode is not set (step 701). As previously described, the external RAM and the latch circuit 60 is configured as shown in FIG. 2. This circuits 60 comprises first and second latch circuits 61 and 62, RAM 63, and a logical product circuit 64. Further, the CPU 109, the I/O ports 110 and 111 and the memory 112 which have been previously mentioned constitute a microprocessor 100. To the first and second latch circuits 61 and 62, an initial reset signal $\overline{R}$ is delivered at the time of initialization thereof. Thus, the CPU 109 in the microcomputer 100 first sets ports P3 to P10 to the output mode, thereafter to output a discrimination signal of "0" indicative of the local number from the port P7 and to output a readout signal of "1" from the port P8. Then, the CPU outputs dial number data of the first digit read from the internal RAM from the ports P3 to P6 to latch it in the circuit 62 by using a latch signal from the port P2. Subsequently, the CPU 109 outputs the dial number data of the second digit from the ports P7 to P10 to output the dial number data of the third digit from the ports P3 to P6 to latch it in the latch circuit 61 by using a latch signal from the port P1. As a result, from the latch circuits 61 and 62, their latch outputs are delivered to the external RAM 63 as address data. Namely, $10^3$ digit, $10^2$ digit, $10^1$ digit and $10^0$ digit of the address data are given by a 5Q output of the latch circuit 62, 1Q to 4Q outputs of the latch circuit 62, 5Q to 8Q outputs of the latch circuit 61 and 1Q to 4Q outputs of the latch circuit 61, respectively. Further, a 6Q output of "1" of the latch circuit 62 is delivered to a write enable terminal $\overline{WE}$ as a readout signal. By switching the I/O ports P3 to P10 to the input mode, thereafter to deliver a chip enable signal to the external RAM 63 through the logical product circuit 64, the contents of the addressed corresponding to the above-mentioned dial number are read out. The reason why these latch circuits 61 and 62 are employed is that the number of ports of the CPU 109 is lacking for directly designating addresses of the RAM 63. Accordingly, where the CPU 109 is provided with a sufficient number of ports so that it can directly output address data internally held, the above-mentioned latch circuitry is not required.

Figure 9:
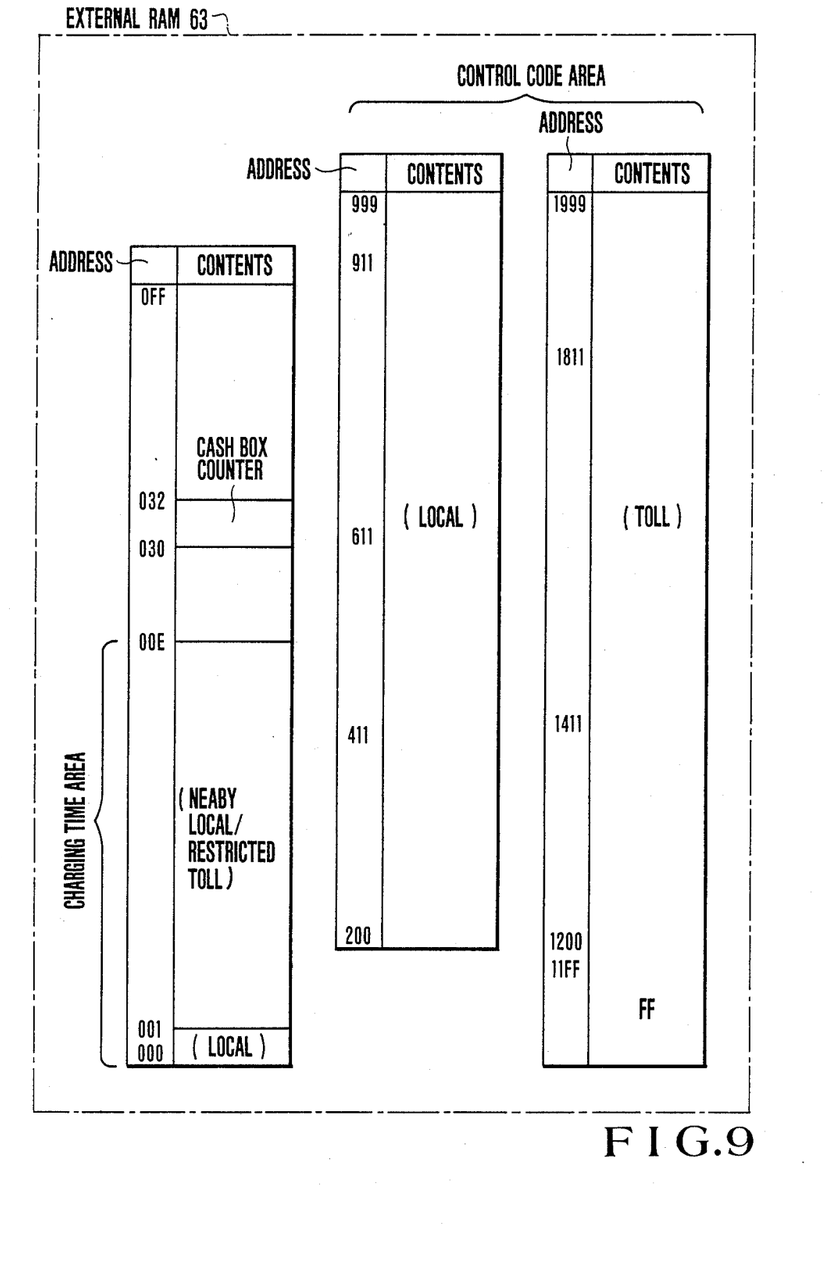
FIG. 9 shows a memory map of the external RAM shown in FIG. 2.

As shown in FIG. 9, the extenral RAM 63 has a control code area in which control codes corresponding to the dial numbers are stored at memory locations assigned to the respective dial numbers. From the addresses designated by the address data corresponding to the dial numbers of three digits output from the latch circuits 61 and 62, corresponding control codes are read out. In FIG. 9, addresses are represented by hexadecimal notation. In the case of the local number, 200 to 999 are assigned to the dial numbers of the high-order three digits. In accordance with this assignment, one of "00"$_{16}$, "01"$_{16}$ to "0E"$_{16}$ or "FF"$_{16}$ is stored at addresses 200 to 911 as a control code of the local number. It is here noted that " "$_{16}$ means that the data of 8 bits is represented by hexadecimal notation. For instance, the control code for addresses 411, 611 and 911 is "00"$_{16}$. This control code indicates the free-charge dial. Further, "01"$_{16}$ to "0E"$_{16}$ are assigned to control codes in the case of nearby local region or dial region where a higher charge should be imposed depending upon a distance instead of a normal local charge by regarding an area treated the same as a local area i.e. a remote area within an original local area as the toll area. In addition, "FF"$_{16}$ is the control code in the case of a normal local dial.

As shown in FIG. 7, where the control code thus read is neither "00"$_{16}$ (step 703) or "FF"$_{16}$ (step 704), the CPU 109 prepares address data corresponding to the control codes, i.e., address data of 001 to 00E corrresponding to the control codes of "01"$_{16}$ to "0E"$_{16}$ to access to the corresponding addresses of the external RAM 63 by making use of the latch circuits 61 and 62 for a second time to read out the contents thereof (step 705). In these memory locations, charging times are stored, respectively. The CPU 109 sets the charging times read therefrom as a timer interval of a timer for an area treated the same as a local area provided by making use of a predetermined area of the internal RAM (step 706) to set display data to a buffer in order to allow the display to indicate the timer interval (step 707), thereafter to set an end flag (step 708), thus completing the third digit processing. The above-mentioned charging timer is controlled later by the reverse signal detector circuit 105 i.e. it is activated when response of a called party is detected and the end of an unit call time is prescribed by its output. The count-up processing of the timer and the display processing of the timer interval are carried out in the interrupt processing.

In contrast, where the control code is "FF"$_{16}$ i.e. an oridinary local dial (step 704), the CPU 109 creates address data of "000" to read thereinto data of charging time of the local call e.g. 1 min. or 2 to 5 min. or unlimitedness stored in a memory location assigned to the above-mentioned data of "000" (step 709) to set the data as a timer interval of the local timer (step 710) and to set the data as display data (step 711). On the other hand, when the control code is "00"$_{16}$ (step 703), the CPU 109 sets the charge-free mode (step 712), thereafter to immediately set the end flag (step 708). Control codes except for the above are judged as error.

Figure 8:
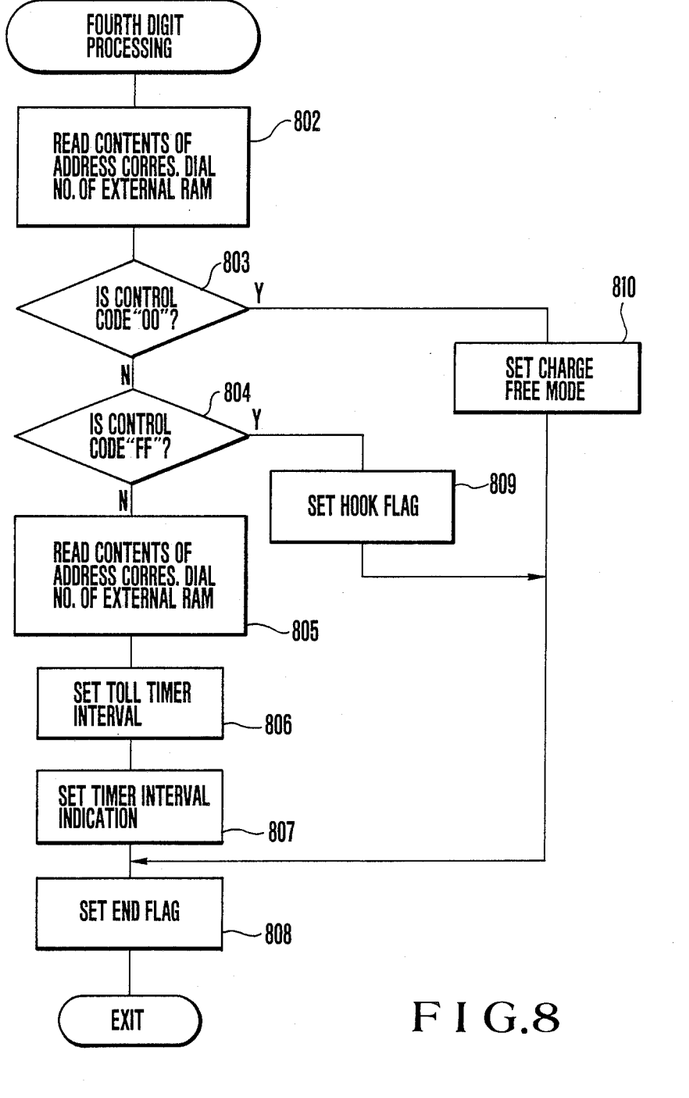

Next, the fourth digit processing will be described with reference to FIG. 8. The CPU 109 accesses to an address corresponding to the dial number in the external RAM 63 (step 802). Namely, the CPU 109 outputs a discrimination signal of "1" indicative of the toll number from the port P7 in the same manner as stated above to output a readout signal of "1", allowing the latch circuit 62 to latch it. Likewise, the CPU 109 outputs the dial number data of the second digit from the ports P3 to P6, allowing the latch circuit 62 to latch it; the dial number data of the third digit from the ports P7 to P10, allowing the latch circuit 61 to latch it; and the dial number data of the fourth digit from the ports P3 to P6, allowing the latch circuit 61 to latch it. The CPU 109 reads thereinto the contents of the memory area i.e. corresponding control codes assigned to addressed 1000 to 1999 designated by these latch outputs. The control code is one of "00"$_{16}$ indicating charge-free, "01"$_{16}$ to "0E"$_{16}$ indicating dial of the restricted toll area where periodic pulse metering charge is exceptionally interposed similarly to the area treated the same as a local area within the toll area, thus to permit a telephone call, and "FF"$_{16}$ indicating inhibit. Only when the control code is not "00"$_{16}$ or "FF"$_{16}$ (steps 803 and 804), the CPU 109 prepares address data 001 to 00E corresponding to these control codes "00"$_{16}$ to "0E"$_{16}$ in the same manner as stated above to access to these address in external RAM 63 to read out the contents thereof i.e. corresponding charging time (step 805). Further, the CPU 109 sets the charging time thus read as a timer interval of the toll timer provided by making use of a predetermined area of the internal RAM and activated by the response of a called party to prescribe the end of unit charging time by its output in a manner similar to the above-mentioned timer treated the same as a local timer and the local timer (step 806) to set the above-mentioned charging time as display data (step 807), thereafter to set an end flag (step 808), thus completing the fourth digit processing.

On the other hand, where the control code is "FF"$_{16}$, i.e. in the case of the inhibit toll dial except for the dial released as the restricted toll call (step 804), the CPU 109 sets a hook flag (step 809). In addition, where the control code is "00"$_{16}$, the CPU sets the charge-free mode (step 810), thereafter to set immediately the end flag (step 808).

The external RAM 63 is back up during on-hook. In addition to the above-mentioned control codes and the charging time data etc., an area for storing data to be reserved during on-hook, e.g., a cash box counter etc. is provided.

The public telephone set in this embodiment is not managed by a person who has set up it or an entrusted person but by an owner who has obtained the ownership of the public telephone set by the deed of transfer. At the time of original installation, the code area of the above-mentioned external RAM is all set to "FF"$_{16}$. In the local call (including a nearby local call, that is a call treated the same as the local call), the local timer interval is set. In the suburb area (including the restricted toll call), the seting is forbidden. Accordingly, after installation, the owner selects a set program to execute it to suitably input a control code by the dial key operation, thus making it possible to desirably set or change the number of the local number treated as the local number and the restricted toll number. The setting of the timer interval of the local timer is made by using a switch SW (dip switch) as shown in FIG. 1. In this case, change of the timer interval is also possible.

In the above-mentioned embodiment, data of "00"$_{16}$ to "0E"$_{16}$ and "FF"$_{16}$ have bee used as the control codes. Instead, data having bit configuration such that "1" is set to one of bits assigned to respective digits may used to discriminate between respective control codes on the basis of the position of the bit to which "1" is set.

Further, instead of control codes, charging time data may be directly stored in a memory area in the external RAM 63 of which addresses are designated by the dial number data. In this case, the operation of an access to the charging time area of the external RAM 63 with the address data created based on the above-mentioned control codes for a second time is not required.

In the above-mentioned embodiment, 10$^3$ digit of the address data in the case of local dial is set to "1" and an area of the order of 10$^3$ is used. Without limiting to this example, by setting 10$^3$ digit to one of "2" to "9", an area of the order of $2 \times 10^3$ to $9 \times 10^3$ may be used, accordingly.

Further, for the address of the charging time area, the control code itself was used as in the above-mentioned embodiment. Instead, corresponding addresses may be independently determined in advance.

Furthermore, a uniform charging timer interval may be provided in respect to the local call to set a charging timer interval depending upon dial number only in the case of the toll call.

In addition, the back-up RAM was used as a memory for storing control codes in the above-mentioned embodiment. In this case, it is possible to desirably change data after installation as previously described. The present invention is not limited to this imprementation. For instance, an EPROM may be used to desirably set data only once or a mask ROM may be used to inhibit change of data by the owner.

Further, the above-mentioned embodiment is configured so that a timer interval was displayed on the display. In the case of counting credit, an available time may be computed on the basis of the credit and the timer interval to display the computer result.

The above-mentioned embodiment was configured so as to detect a reverse signal from the switching board for the purpose of detecting the responding of a called party when dial calling occurs. In stead of the above-mentioned detection means, a ring back-tone end detection means which detects the end of a ring back-tone from the switching board may be used. In addition, a call signal detection means which detects a speech signal from a called party may be used. Such a ring back-tone end detection means or a call signal detection means is configured as shown in U.S. Pat. No. 4,122,308.

Further, a unit calling time may be used instead of the unit calling charge employed in the above-mentioned embodiment, for fixed information memorized in advance in the memory for effecting the charging processing.

Figure 10:
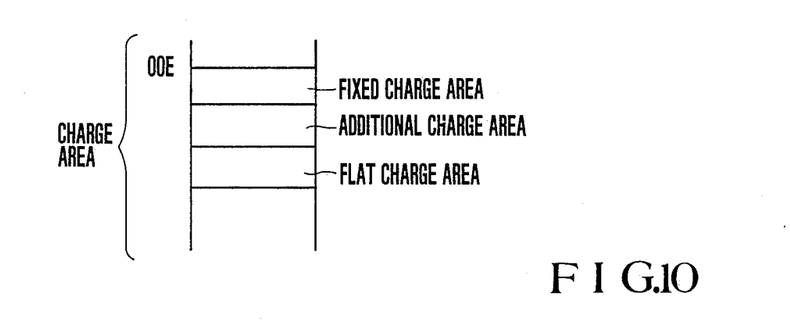
FIG. 10 shows a modified memory map of FIG. 9.

Moreover, as shown in FIG. 10, a fixed charge and an additional charge necessary for adopting the unit charging rate system as well as a flat charge are set in a charge area in which the fixed information is stored. Thus, by selecting switches included in the dip switch SW, it may be determined to employ either the unit calling charge system or the flat charge system.

Further, the present invention may be practiced as follows:

The dial control code include a local calling code and a switch for setting a local charging time or a local charging rate is further provided. When the local call code in read from the memory, the charging information means determines the local charging time or local charging rate on the basis of the set information of the setting switch.

Further, as previously described, the second memory in which variable information is stored in advance is provided. Thus, the charging information determination means designates address of the second memory by using the dial control code read from the memory to further read out corresponding variable information to determine the calling time or calling charge.

In such a case, the first and second memories may be configured with a single memory wherein the variable information is read by address data using the dial control code obtained by reading once the contents of the holding means from the memory. Further, a plurality of variable information corresponding to a plurality of charging patterns may be stored in the second memory per each dial control code and a select switch for selecting the charging patterns may be further provided. Thus, the charging information determination means can read out the variable information determined on the basis of the select switch information.

As is clear from the foregoing description, a public telephone set according to the present invention provided with call originating means and having a function to effect a charging processing is characterized in that the public telphone set comprises detector means for monitoring the condition of a telephone circuit after the dial originating to detect a response of a called party, holding means for holding a predetermined number of digits of the originating dial number output by the dial originating operation per each digit as a code of a plurality of bits, memory means in which dial control code corresponding to the predetermined number of digits of the originating dial number is stored in advance, addresses of the memory means being designated by the code output of the plurality of bits of the holding means whereby a corresponding dial control code is read out, charging information determination means for determining a charging time and a charging rate on the basis of variable information based on the control code read out from the memory means and fixed information set in advance, and charging operation control means activated by the output of the detector means to control the charging operation on the basis of the charging information from the charging information determination means.

Accordingly, in the case of connecting to a switching board to which an office multi-charging signal based on the periodic pulse metering method is not transmitted and of enabling toll call on the basis of the terminal charging system, the public telephone set of the invention can easily increase the number of digits of a dial number and a timer interval taken into consideration for determining the timer interval, thus making it possible to effect a fine setting.

What is claimed is:

1. A public telephone set provided with dial means for dialing a telephone number to be called and initiating a charging process, the public telephone set comprising:
   (a) discriminating means for monitoring the condition of a telephone line after a number has been dialed to discriminate a response of a called party.
   (b) holding means for holding a predetermined number of digits of the dialed number output by the dial means, each of said digits represented by a digit code having a plurality of bits,
   (c) first memory means in which dial control codes corresponding to said predetemrined number of digits of said dialed number are stored in said first memory means at addresses designated by said digit code,
   (d) second memory means having addresses which are designated through the use of the dial control codes of said first memory means for storing charging information corresponding to said dial control codes,
   (e) said first memory means being provided with a local call area and a toll call area which are respectively selected according to digit code data from said holding means,
   (f) charging information determining means for determining charging time periods and amounts with reference to said first and second memory means, and
   (g) charging operation control means activated by an output of said discriminating means to control the charging operation on the basis of a charging information from said charging information determination means.

2. A public telephone set as set forth in claim 1, wherein said first and second memory means comprise a single memory.

3. A public telephone set as set forth in claim 1, wherein a plurality of variable information corresponding to a plurality of charging patterns are stored in said second memory for each of said dial control codes, further comprising a select switch for selecting a charging pattern said charging information determination means being operative to read out said variable information designated on the basis of information from said select switch.

4. A public telephone set as set forth in claim 1, wherein said discriminating means is a reverse signal detector means which detects a reverse signal from an exchange office based on a response of a said called party.

5. A public telephone set as set forth in claim 1, wherein said charging information of said second memory means represents a unit charging increment, said charging information determination means being operative to determine a charging time per said charging increment on the basis of the said dial control code from said first memory means.

6. A public telephone set as set forth in claim 1, wherein said charging information of said second memory means represents a unit charging time, said charging information determination means being operative to determine a charging rate per said unit charging time on the basis of said dial control code from said first memory means.

7. A public telephone set as set forth in claim 1, wherein said charging information of said second memory means represents a fundamental charging time and an additional charging time, said charging information determination means being operative to determine a first charging rate for said fundamental charging time and a second charging rate for said additional charging time on the basis of said dial control code from said first memory means.

8. A public telephone set as set forth in claim 1, wherein said first memory means stores therein at least one of a charge free code and an inhibit code.

9. A public telephone set as set forth in claim 1, wherein said dial control codes include a local call code, and further comprising a switch for a local charging time or a local charging rate, said charging information determination means being operative to determine said local charging time or said local charging rate on the basis of information set in said switch when said local call code is read from said first memory means.

10. A public telephone set as set forth in claim 1, which further comprises display means which indicates for users charging information determined by said charging information determination means.

11. A public telephone set as set forth in claim 1, wherein said second memory means is comprised of a volatile memory, said public telephone set being provided with a power circuit to back up said volatile memory during on-hook.

12. A public telephone set as set forth in claim 1, wherein when a program stored in said first memory means is initialized, a local call code is set to all memory areas constituting said local call area of said first memory means and an inhibit code is set to all memory areas constituting said toll call area of said first memory means.

13. A public telephone set as set forth in claim 1, which further comprises a read only memory in which a set program is stored in advance and select means for selecting said set program, whereby when said set program is selected by said select means, said dial control code of said first memory means or charging information of said second memory means is directly entered by a dial key input.

14. A public telephone set as set forth in claim 13, wherein said select means is comprised of a switch.

15. A public telephone set as set forth in claim 13, wherein said select means is comprised of means for discriminating a special code from a dial key.

* * * * *

UNITED STATES PATENT AND TRADEMARK OFFICE
CERTIFICATE OF CORRECTION

PATENT NO. : 4,768,223
DATED : 08/30/88
INVENTOR(S) : Kenoshita

It is certified that error appears in the above-identified patent and that said Letters Patent is hereby corrected as shown below:

| COLUMN | LINE | DESCRIPTION |
|--------|------|-------------|
| 04 | 20 | delete "predeterined" insert --predetermined-- |
| 04 | 46 | delete "(step 501)" insert --(step 502)-- |

Signed and Sealed this

Twenty-eighth Day of February, 1989

Attest:

DONALD J. QUIGG

Attesting Officer

Commissioner of Patents and Trademarks